US011939857B1

(12) United States Patent
Wang et al.

(10) Patent No.: US 11,939,857 B1
(45) Date of Patent: Mar. 26, 2024

(54) THREE-DIMENSIONAL INVERSION OF MULTI-COMPONENT ELECTROMAGNETIC MEASUREMENTS USING A FAST PROXY MODEL

(71) Applicant: Halliburton Energy Services, Inc., Houston, TX (US)

(72) Inventors: Xusong Wang, Singapore (SG); Ahmed Elsayed Fouda, Pearland, TX (US); Xiang Wu, Singapore (SG); Christopher Michael Jones, Houston, TX (US); Wei Zhang, Katy, TX (US); Junwen Dai, The Woodlands, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 18/075,916

(22) Filed: Dec. 6, 2022

(51) Int. Cl.
*E21B 44/00* (2006.01)
*E21B 7/10* (2006.01)
*E21B 47/02* (2006.01)

(52) U.S. Cl.
CPC ............... *E21B 44/00* (2013.01); *E21B 7/10* (2013.01); *E21B 47/02* (2013.01); *E21B 2200/22* (2020.05)

(58) Field of Classification Search
CPC . E21B 44/00; E21B 7/10; E21B 47/02; E21B 2200/22
See application file for complete search history.

(56) References Cited

U.S. PATENT DOCUMENTS

| 6,791,469 | B1 | 9/2004 | Rao et al. |
| 11,346,215 | B2 * | 5/2022 | Vempati ............... G01V 11/002 |
| 2007/0208546 | A1 | 9/2007 | Fang et al. |
| 2016/0108728 | A1 * | 4/2016 | Freese ..................... G01V 8/20 |
| | | | 166/250.01 |

(Continued)

FOREIGN PATENT DOCUMENTS

EP 2015109 A1 1/2009

OTHER PUBLICATIONS

Abstract of Krohne, Klaus et al., "Frequency-domain finite-vol. simulations", 2007 European Microwave Conference, 2007, pp. 158-161, doi: 10.1109/EUMC.2007.4405150.

(Continued)

*Primary Examiner* — Yong-Suk (Philip) Ro
(74) *Attorney, Agent, or Firm* — NOVAK DRUCE CARROLL LLP

(57) ABSTRACT

Described herein are systems and techniques for monitoring for monitoring and evaluating conditions associated with a wellbore and wellbore operations that use neural operators instead of computationally intensive iterative differential equations. Such systems and techniques allow for determinations to be made as operations associated with a wellbore are performed. Instead of having to wait for computationally intensive tasks to be performed or take risks of proceeding with a wellbore operation without real-time evaluations being performed, these wellbore operations may be continued while determinations are timely made, thus improving operation of computing systems that perform evaluations and that make decisions regarding safely and efficiently performing wellbore operations such as drilling a wellbore, cementing wellbore casings in place, or injecting fluids into formations of the Earth.

20 Claims, 8 Drawing Sheets

(56) References Cited

U.S. PATENT DOCUMENTS

| | | |
|---|---|---|
| 2018/0017691 A1 | 1/2018 | Dirksen et al. |
| 2018/0291723 A1 | 10/2018 | Chang et al. |
| 2022/0120928 A1* | 4/2022 | Hori .................... G01N 29/032 |
| 2022/0317332 A1* | 10/2022 | Bowden, Jr. ............ E21B 43/00 |
| 2023/0358914 A1* | 11/2023 | Fouda .................... G01V 3/30 |

OTHER PUBLICATIONS

Abstract of Mohammadian, Alireza H et al., "Computation of electromagnetic scattering and radiation using a time-domain finite-volume discretization procedure", Computer Physics Communications; vol. 68, Issues 1-3, Nov. 1991, pp. 175-196.

Abstract of Chen, Hui et al., "A finite-volume solution to 3D frequency-domain electromagnetic modelling using Lorenz-gauged magnetic vector and scalar potentials", Aug. 2016; DOI:10.6038/cjg20160831.

Abstract of Shankar, Vijaya et al., "A Time-Domain, Finite-Volume Treatment for the Maxwell Equations", vol. 10, 1990—Issue 1-2; pp. 127-145 | Published online: Feb. 1, 2007.

International Search Report & Written Opinion; PCT Application No. PCT/US2022/052214; dated Sep. 1, 2023.

\* cited by examiner

THREE-DIMENSIONAL INVERSION OF MULTI-COMPONENT ELECTROMAGNETIC MEASUREMENTS USING A FAST PROXY MODEL

TECHNICAL FIELD

The present disclosure is generally directed to collecting and evaluating wellbore data. More specifically, the present disclosure is directed to using neural operators to identify wellbore conditions more quickly.

BACKGROUND

When managing oil and gas drilling and production environments (e.g., wellbores, etc.) and performing operations in the oil and gas drilling and production environments, it is important to obtain and evaluate measurements and other sensor data and details regarding Earth formations and conditions in the vicinity of a wellbore. Such data may be used to understand downhole conditions and help manage wellbore associated operations. For example, sensor data can be used to identify features within the Earth formations, whether the Earth formations are stable and being used in a controlled way. However, the downhole conditions and constraints can create significant challenges in deploying systems such as sensors and monitoring conditions downhole. Furthermore, available computing resources used to make determinations can cause expensive delays in wellbore operations. What are needed are improvements in computer technology that allow determinations to made more quickly and efficiently such that wellbore operations may be safely and expeditiously performed. Non-limiting illustrative examples of such conditions and constraints can include extreme temperatures, extreme pressures, space constraints, formation resistivity, formation conductivity, formation permeability, and complex mixtures of different elements, among others.

BRIEF DESCRIPTION OF THE DRAWINGS

In order to describe the manner in which the features and advantages of this disclosure can be obtained, a more particular description is provided with reference to specific implementations thereof which are illustrated in the appended drawings. Understanding that these drawings depict only exemplary implementations of the disclosure and are not therefore to be considered to be limiting of its scope, the principles herein are described and explained with additional specificity and detail through the use of the accompanying drawings in which.

DETAILED DESCRIPTION

Figure 1A:
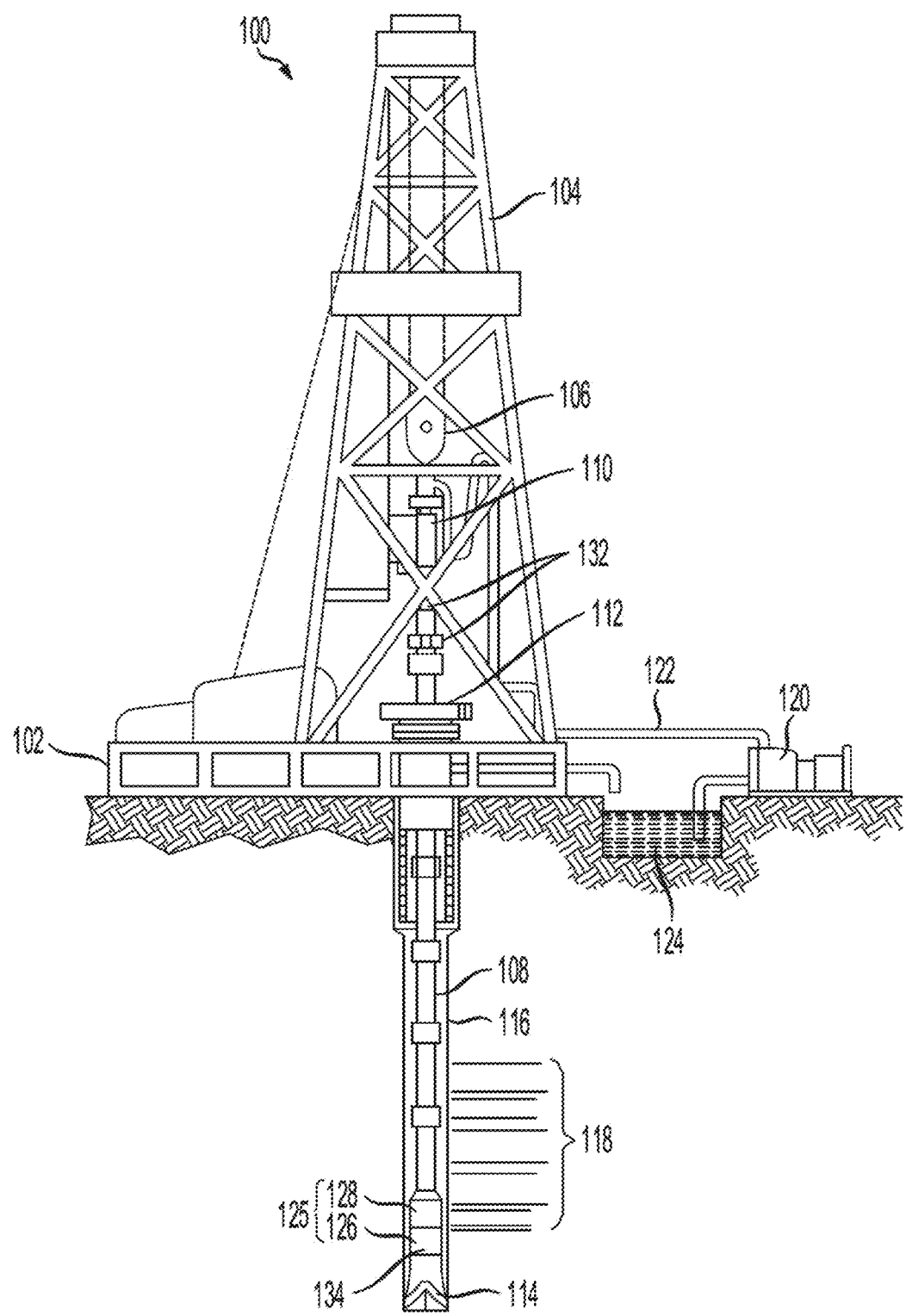
FIG. 1A is a schematic diagram of an example logging while drilling wellbore operating environment, in accordance with various aspects of the subject technology.

Various aspects of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the methods and apparatus described herein. However, it will be understood by those of ordinary skill in the art that the methods and apparatus described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the present disclosure.

Described herein are systems, apparatuses, processes (also referred to as methods), and computer-readable media (collectively referred to as "systems and techniques") for monitoring and evaluating conditions associated with a wellbore and wellbore operations. Even though computer technologies have advanced greatly over the last several decades, modern computer systems and techniques still are a major bottleneck to the development, deployment, and management of wells drilled in the Earth. This is because performing calculations on large sets of collected data is inefficient even when the most advanced computers are used for the task. For example, when a wellbore is being drilled, drilling equipment may drill into harder materials within an Earth formation that could otherwise be avoided because computations required to identify locations where these harder materials are located take longer to complete than the time it takes for a drill to advance into these harder materials. In such an instance, areas near a wellbore may include softer materials (e.g., sandstone) and harder materials (e.g., granite). In an instance when differential equations are solved using a computer to identify wellbore conditions, the processor(s) of the computer may simply take longer than is available to complete an evaluation. Instead of using differential equations, systems and techniques of the present disclosure may use neural operators to perform inversions on collected data to make determinations regarding the wellbore conditions more quickly. This means that by using neural operators, evaluations may be performed fast enough to steer a drill when a wellbore is drilled to a destination in the Earth, where other more computationally intense techniques could not achieve such a task. Simply put, systems used to sense and make evaluations regarding a wellbore must be able to do so in a timely way such that potential negative outcomes can be avoided. Such negative outcomes may include yet are not limited to, drilling into hard materials that can wear or damage a drill bit or drilling into types of strata that are undesirable for a given purpose.

Systems and techniques for monitoring for monitoring and evaluating conditions associated with a wellbore and wellbore operations that use neural operators instead of computationally intensive iterative differential equations are disclosed. Such systems and techniques allow for determinations to be made as operations associated with a wellbore are performed. Instead of having to wait for computationally intensive tasks to be performed or take risks of proceeding with a wellbore operation without real-time evaluations being performed, these wellbore operations may be continued while determinations are timely made, thus improving operation of computing systems that perform evaluations and that make decisions regarding safely and efficiently performing wellbore operations such as drilling a wellbore, cementing wellbore casings in place (in manner that supports the casing in the wellbore), or injecting fluids into formations of the Earth.

Knowledge of current and changing conditions of Earth formations or wellbore conditions is critical to being able to develop and use a wellbore effectively and efficiently over the lifespan of the wellbore. In one instance, when a well is drilled, data associated with Earth formations around drilling equipment are collected and evaluated when the drilling equipment is steered toward a destination in the Earth. Here again this may include avoiding harder rock formations and drilling though softer rock formations. This may also include selecting areas of the Earth to drill through that are more permeable such that operations associated with the sequestering of carbon dioxide ($CO_2$), with hydraulic fracturing, or with accessing hydrocarbons (gas and/or oil) located within the Earth can be performed more efficiently.

In some examples, the systems and techniques described herein can collect sensor data and use the sensor data to assess whether a carbon dioxide sequestering process is proceeding according to a $CO_2$ sequestering rule that dictates that injected $CO_2$ should be contained within a reservoir portion of Earth formations such that no more than a threshold amount of $CO_2$ should escape out of the reservoir. Such a $CO_2$ sequestering rule could dictate levels of $CO_2$ stability within a reservoir, an injection rate of $CO_2$, a $CO_2$ injection pressure range, a temperature associated with injecting $CO_2$, or may dictate that injected $CO_2$ should not escape boundaries of an underground reservoir. Additionally, or alternatively, the systems and techniques described herein can collect data indicative of areas were a hydraulic fracturing fluid is moving or has moved in Earth formations during a hydraulic fracturing process. In some aspects, the systems and techniques described herein can monitor the injection of $CO_2$ into Earth formations and the stability of the $CO_2$ injected into the Earth formations. In other examples, the systems and techniques described herein can be used to monitor other materials and/or elements injected into a formation accessible through a wellbore. For example, the systems and techniques described herein can monitor injections of steam, water, a solvent(s), and/or other materials and/or elements. In some cases, the injection of such materials and/or elements can be performed and/or monitored while the systems and techniques described herein performs hydraulic fracturing.

In some aspects, the systems and techniques described herein can monitor substances that are injected into an Earth formation over time. In some examples, the substances can include, without limitation, $CO_2$ from a carbon capture and storage (CCS) process and/or water and/or steam injected for an enhanced oil recovery (EOR) process, among others. Data collected and evaluated with such processes are performed may include electromagnetic (EM) data or acoustic data. In such instances, pulses of energy (e.g., EM energy or acoustic energy) may be emitted by an emitter and may be received by sensors. Such emitters may transmit energy into the Earth and such sensors may receive either EM or acoustic energy after that energy has propagated through the formations within the Earth. In certain instances, energy may be transmitted from an emitter that is not located in the wellbore and portions of that transmitted energy may be received by a sensor located with the wellbore. In other instances energy may be transmitted from an emitter that is located within the wellbore and reflections of that energy may be received by a sensor located within the wellbore.

Electromagnetic energy may be transmitted into an area of the Earth that is in the proximity of a wellbore using a first set of electrical/electronic components. A portion of the EM energy transmitted into the Earth may also be received by other components as EM signals by components such as electric field sensors, magnetic field sensors, or EM field sensors that are located outside of a wellbore casing implemented in a wellbore environment. Additionally, or alternatively, galvanic devices attached to the wellbore casing may be used to receive or transmit EM signals.

One purpose of open-hole well logging is to obtain Earth formation information associated with areas near a borehole or wellbore. This information can be used for geo-steering or formation evaluation while or after drilling. Logging while drilling (LWD) and wireline resistivity logging use electromagnetic (EM) wave measurements to investigate the formation nearby the borehole. Sensors that sense data or log measurements may only be made within a borehole. Collected data may be used to compute the formation parameters (e.g., resistivity distributions of ground or Earth formation) from measured or sensed data. These measurement data may be used to in calculations that identify material properties of the Earth, a traditional computationally intensive process, called inversion has been employed yet differential equations associated with such approaches constrain wellbore operations in ways that increase costs, decrease efficiency, and increase risks associated with performing a wellbore operation. Current inversion algorithms fall short of efficiently solving for formation parameters in three dimensions (3D) at the well-site, this is true even when high-performance computers or graphic processing units (GPUs) are used to perform computations. In certain instances, the data has to be sent to remote data center and the 3D inversion results can only be obtained as a postprocessing answer product after, which reduces their value for real-time decision-making such as steering a drill (geo-steering) during a well drilling operation. Bottlenecks associated with computer models that perform such calculations often occurs when a forward model that has to be called iteratively many during an inversion process. Traditional ways that solve equations and generate results involve either numerical methods or semi-analytical methods such as numerical mode matching (NMM). Both approaches are time consuming and ill-suited for real-time applications. Such traditional methods are, therefore, tedious and time-consuming as the processing of EM measurement data using inversion involves solving equations like Maxwell's equations many times with different candidate model parameters on a path to convergence. The limitations of these traditional approaches are also compounded as EM measurement datasets grow in size. Since dataset size at least scales with increasing the resolution of images associated with characterizing Earth formations, dataset sizes increase based on requirements for performing wellbore. operations.

Instead of performing complex mathematical functions using large datasets, systems and techniques of the present disclosure use network operators, such as a Fourier neural operator (FNO) or a physics-informed neural operator (PINO) to perform transforms such as Fourier transforms or inverse Fourier transforms. Such FNO or PINO neural operator techniques may also include a number of iterative calculations performed in an iterative way or this process may be further enhanced by using FNO or PINO neural operator techniques without iterative calculations.

Systems and techniques of the present disclosure may be used to modify a numerical physical configuration of well logging tools to extend the usage of FNO or PINO when an actual physical configuration does not meet with a particular FNO/PINO application requirement. All measurement components for all frequencies used to collect EM measurement data may be combined and a neural network operator may be used to predict all measurement components. Alternatively, or additionally, a chain of FNO models to first predict measurements of a material function, for example an amplitude of an EM measurement signal may correspond to a material function. This predicted amplitude and the material function may be provided as inputs to a second FNO for predicting a phase associated with an EM signal.

In certain instances, processes may include regularizing or normalizing a pixel-based inversion by solving for a subset of a set of spatial harmonics of a set of model parameters. This may be performed instead of performing evaluations associated with a spatial distribution of the model parameters. For training a neural operator, low-pass filtered material functions can be used instead of the original material functions to make the neural operator more compatible with a formation model predicted by the inversion.

The conditions of an open-hole borehole may be identified from collected two-dimensional (2D) Earth formation data. This data may be used to identify metrics such as conductivity, resistivity, or permeability of areas within the Earth. Measurements associated with EM waveform phase and amplitude along the borehole over depth and in different directions may require the use of multiple different frequencies of EM signals such that 2D or 3D data may be evaluated. This means that several EM source frequencies, source polarizations, and receiver polarizations may be used to increase information redundancy such that higher resolution data may be collected, evaluated, and used to control wellbore operations.

This may include transmitting EM signals and receiving portions of those transmitted EM signals using a multi-component induction (MCI) tool. Such a tool may include a triad of transmitter coils orienting along different axes (e.g., along an X axis, a Y axis, and a Z axis) and a triad of receiver coils with similar orientation axes. The receiver coils may be used to collect electromagnetic signals from a surrounding formation which is excited by the transmitter coils. Data collected and evaluated by systems and techniques of the present disclosure may not be limited to or may alternatively include acoustic data collected based on transmitting acoustic signals through the Earth.

Resistivity of Earth formations is highly sensitive to fluid (e.g., water, steam, or CO2) saturation. EM data can be acquired and processed to monitor the progression of an injected substance over time. This acquired EM data may be processed to generate images that visually show the progression of the injected substance. Such visualizations may show areas where CO2 or other injected materials have moved/progressed into areas of an Earth formation. For example, an area where cracks in the Earth are used as a CO2 sequestration reservoir may be depicted as that are is filled with CO2. Evaluations made on the acquired EM data may identify whether resistivities within an underground reservoir or Earth formations that surround that formation are increasing or decreasing. Typically, CO2 and steam have higher resistivities than the formation fluids in place, such as oil, water, mixtures of fluids and any other substances/materials (e.g., mixtures of water, oil, gas, etc.), etc. Therefore, the CO2 and/or the steam can cause an increase in the formation resistivity. On the other hand, salt water that may be used in waterflood injections typically results in a decrease in the formation resistivity. Increasing or decreasing resistivities within a reservoir may indicate that the reservoir is being filled with an injected substance. The filling of an underground reservoir with CO2 may be identified from increased resistivity of the reservoir and such an observation may indicate that the CO2 is progressing into the reservoir as planned. Increasing or decreasing resistivities of areas that surround an underground reservoir may indicate that the reservoir has reached a maximum capacity or is saturated. For example, when additional fluid (e.g., water, steam, or CO2) is injected into the reservoir results in a least a portion of the fluid being forced into the areas that surround the underground reservoir, the reservoir may be judged as being full.

The systems and techniques described herein can be used to monitor CO2 reservoirs in wellbore environments having one or more topologies such as, for example, surface-to-borehole, borehole-to-surface, and borehole-to-borehole, among others. In some cases, the systems and techniques described herein can implement an integrated system including surface-to-borehole, borehole-to-surface, and/or borehole-to-borehole EM sensors. The EM sensors downhole can be powered and can communicate wirelessly through the casing to one or more receiver devices such as, for example, one or more telemetry stations affixed to a tubing deployed in the wellbore environment. In some cases, power and communication lines can be implemented to run on an outside portion of the tubing (e.g., in an annulus) and can therefore be protected from abrasive exposure to the formation rock and fluids.

Examples of the systems and techniques described herein are illustrated in FIG. 1 through FIG. 6 and described below.

FIG. 1A is a schematic diagram of an example logging while drilling wellbore operating environment, in accordance with various aspects of the subject technology. The drilling arrangement shown in FIG. 1A provides an example of a logging-while-drilling (commonly abbreviated as LWD) configuration in a wellbore drilling scenario 100. The LWD configuration can incorporate sensors (e.g., EM sensors, seismic sensors, gravity sensor, image sensors, etc.) that can acquire formation data, such as characteristics of the formation, components of the formation, etc. For example, the drilling arrangement shown in FIG. 1A can be used to gather formation data through an electromagnetic imager tool (not shown) as part of logging the wellbore using the electromagnetic imager tool. The drilling arrangement of FIG. 1A also exemplifies what is referred to as Measurement While Drilling (commonly abbreviated as MWD) which utilizes sensors to acquire data from which the wellbore's path and position in three-dimensional space can be determined. FIG. 1A shows a drilling platform 102 equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, it creates a wellbore 116 that passes through various subterranean formations 118. A pump 120 circulates drilling fluid through a supply pipe 122 to top drive 110, down through the interior of drill string 108 and out orifices in drill bit 114 into the wellbore. The drilling fluid returns to the surface via the annulus around drill string 108, and into a retention pit 124. The drilling fluid transports cuttings from the wellbore 116 into the retention pit 124 and the drilling fluid's presence in the annulus aids in maintaining the integrity of the wellbore 116. Various materials can be used for drilling fluid, including oil-based fluids and water-based fluids.

Logging tools 126 can be integrated into the bottom-hole assembly 125 near the drill bit 114. As drill bit 114 extends into the wellbore 116 through the formations 118 and as the drill string 108 is pulled out of the wellbore 116, logging tools 126 collect measurements relating to various formation properties as well as the orientation of the tool and various other drilling conditions. The logging tool 126 can be applicable tools for collecting measurements in a drilling scenario, such as the electromagnetic imager tools described herein. Each of the logging tools 126 may include one or more tool components spaced apart from each other and communicatively coupled by one or more wires and/or other communication arrangement. The logging tools 126 may also include one or more computing devices communicatively coupled with one or more of the tool components. The one or more computing devices may be configured to control or monitor a performance of the tool, process logging data, and/or carry out one or more aspects of the methods and processes of the present disclosure.

The bottom-hole assembly 125 may also include a telemetry sub 128 to transfer measurement data to a surface receiver 132 and to receive commands from the surface. In at least some cases, the telemetry sub 128 communicates with a surface receiver 132 by wireless signal transmission (e.g., using mud pulse telemetry, EM telemetry, or acoustic telemetry). In other cases, one or more of the logging tools 126 may communicate with a surface receiver 132 by a wire, such as wired drill pipe. In some instances, the telemetry sub 128 does not communicate with the surface, but rather stores logging data for later retrieval at the surface when the logging assembly is recovered. In at least some cases, one or more of the logging tools 126 may receive electrical power from a wire that extends to the surface, including wires extending through a wired drill pipe. In other cases, power is provided from one or more batteries or via power generated downhole.

Collar 134 is a frequent component of a drill string 108 and generally resembles a very thick-walled cylindrical pipe, typically with threaded ends and a hollow core for the conveyance of drilling fluid. Multiple collars 134 can be included in the drill string 108 and are constructed and intended to be heavy to apply weight on the drill bit 114 to assist the drilling process. Because of the thickness of the collar's wall, pocket-type cutouts or other type recesses can be provided into the collar's wall without negatively impacting the integrity (strength, rigidity and the like) of the collar as a component of the drill string 108.

Figure 1B:
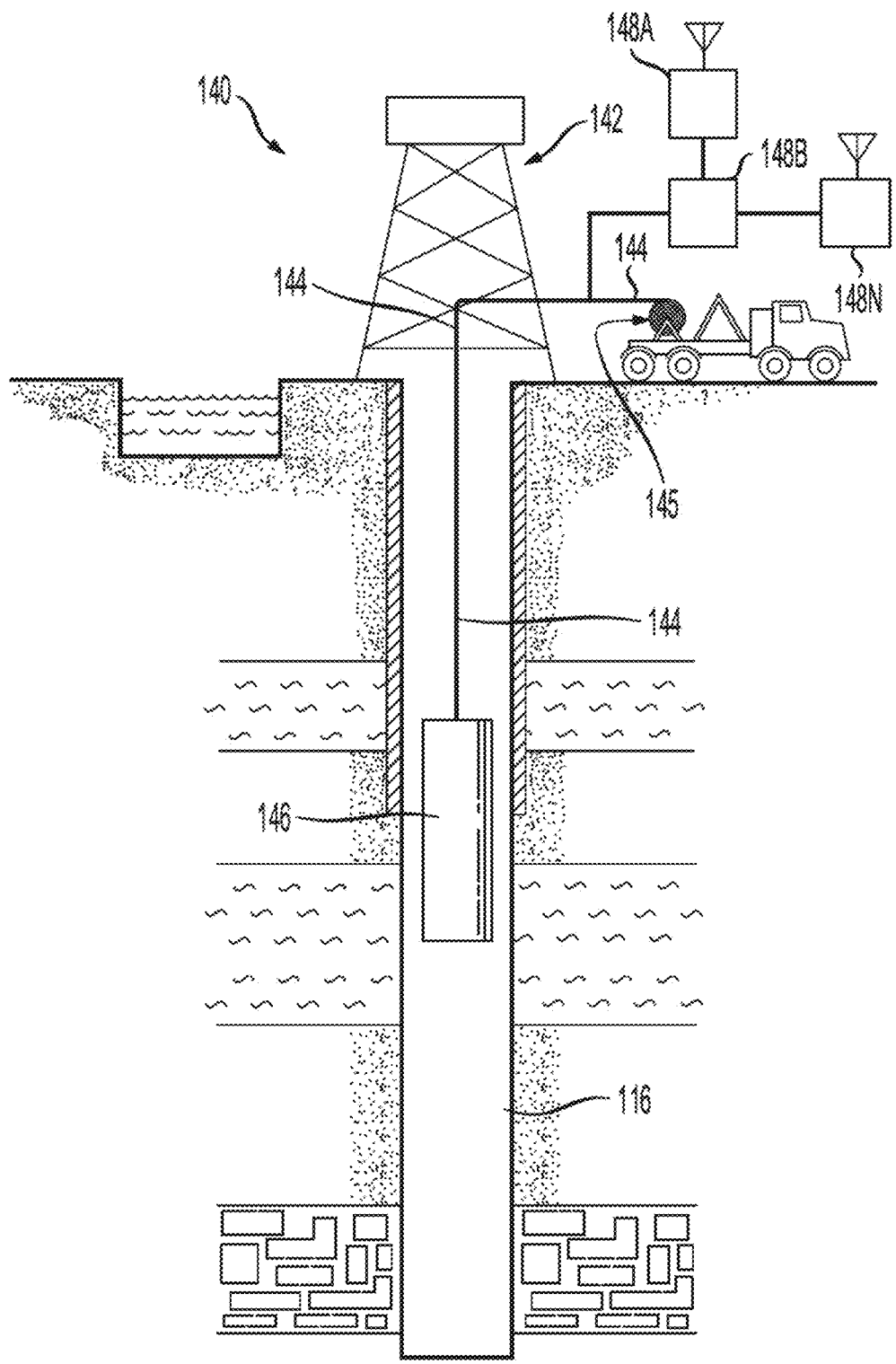
FIG. 1B is a schematic diagram of an example downhole environment having tubulars, in accordance with various aspects of the subject technology.

FIG. 1B is a schematic diagram of an example downhole environment having tubulars, in accordance with various aspects of the subject technology. In this example, an example system 140 is depicted for conducting downhole measurements after at least a portion of a wellbore has been drilled and the drill string removed from the well. An electromagnetic imager tool (not shown) can be operated in the example system 140 shown in FIG. 1B to log the wellbore. A downhole tool is shown having a tool body 146 in order to carry out logging and/or other operations. For example, instead of using the drill string 108 of FIG. 1A to lower the downhole tool, which can contain sensors and/or other instrumentation for detecting and logging nearby characteristics and conditions of the wellbore 116 and surrounding formations, a wireline conveyance 144 can be used. The tool body 146 can be lowered into the wellbore 116 by wireline conveyance 144. The wireline conveyance 144 can be anchored in the drill rig 142 or by a portable means such as a truck 145. The wireline conveyance 144 can include one or more wires, slicklines, cables, and/or the like, as well as tubular conveyances such as coiled tubing, joint tubing, or other tubulars. The downhole tool can include an applicable tool for collecting measurements in a drilling scenario, such as the electromagnetic imager tools described herein.

The illustrated wireline conveyance 144 provides power and support for the tool, as well as enabling communication between data processors 148A-N on the surface. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more of the processors 148A-N, which can include local and/or remote processors. The processors 148A-N can be integrated as part of an applicable computing system, such as the computing device architectures described herein. Moreover, power can be supplied via the wireline conveyance 144 to meet power requirements of the tool. For slickline or coiled tubing configurations, power can be supplied downhole with a battery or via a downhole generator.

The systems and techniques described herein can monitor substances that are injected into an Earth formation overtime. Injecting a substance into the formation, whether that be CO2 from carbon capture and storage (CCS) process or water and/or steam injected for enhanced oil recovery (EOR), amounts to fluid substitution between formation fluids in place and the injected substance within a target reservoir formation. Given that formation resistivity is highly sensitive to fluid saturation, electromagnetic (EM) data can be acquired, processed, and imaged to monitor the progression of the injected substance over time. Typically, CO2 and steam have higher resistivities than the formation fluids in place and therefore cause an increase in the formation resistivity. On the other hand, salt water can be used in waterflood injection and therefore causes a decrease in formation resistivity. By continuously monitoring substance injections, the systems and techniques described herein can detect leakage from capture reservoirs in a CCS application and/or prevent water intrusion from reducing production in EOR applications.

Figure 2:
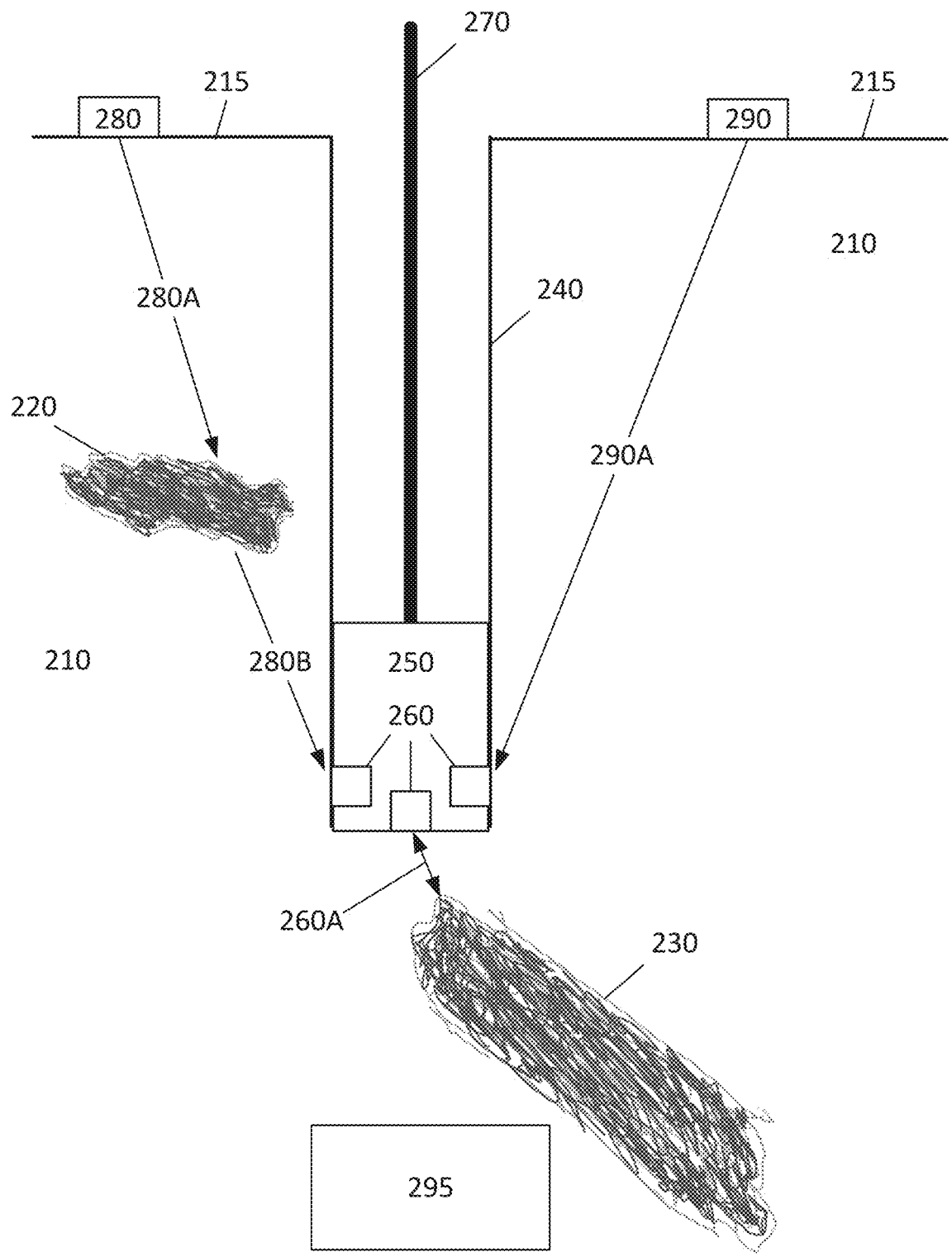
FIG. 2 illustrates a set of equipment that may be deployed in a wellbore that is being drilled or that is has been drilled into the Earth, in accordance with various aspects of the subject technology.

FIG. 2 illustrates a set of equipment that may be deployed in a wellbore that is being drilled or that is has been drilled into the Earth. FIG. 2 includes wellbore 240 that has been drilled into a part of the Earth 210. FIG. 2 also includes Earth formations 220 and 230 that may be made of different substances or have a different porosity than the other parts of the Earth 210 near wellbore 240. Earth formations 220 and 230 may be of a type of material that should be avoided when a wellbore 240 is drilled. Apparatus 250 is located within wellbore 240 and apparatus 250 is illustrated as including sensing and/or transmitting elements 260 that may transmit and/or receive electromagnetic (EM) signals or acoustic signals. Apparatus 250 is coupled to a conveyance system 270 that may be used to lower apparatus 250 into wellbore 240. In certain instances, apparatus 250 may include a drill bit, a cementing tool, or a device through which fluids (e.g., carbon dioxide or hydraulic fracturing fluids) may be injected into the Earth. When apparatus 250 includes a drill, conveyance system 270 may include a shaft that turns the drill of apparatus 250 when wellbore 240 is drilled.

FIG. 2 illustrates two different electronic devices 280 and 290 located at the Earth's surface 215. Electronic devices 280 and 290 may include transmitters that transmit EM or acoustic energy into the Earth 210 for receipt by sensors and/or transmitters 260 of apparatus 250. Note that electronic device 280 transmits energy 280A into Earth 210 and that energy proceeds through materials of Earth formation 220 and toward sensors and/or transmitters 260 as indicated by arrowed line 280B. Similarly, electronic device 290 transmits energy 290A into the Earth 210 for receipt by sensors and/or transmitters 260. Doubled line 260A illustrates energy transmitted and received by sensors and/or transmitters 260. This may include transmitters and/or receives 260 transmitting an EM or acoustic signal and that signal being reflected off Earth formation 230 and then received by sensors of the transmitters and/or sensors 260.

In the instance mentioned above, where Earth formation 220 and 230 include materials that should be avoided during a drilling operation, Data sensed by transmitting and/or sensing elements 260 may be processed to identify relative locations between a current position of apparatus 250 and Earth formations 220 and 230. The time it takes to identify relative locations of materials of Earth formations 220 and 230 may take longer than it takes for apparatus 250 to drill wellbore 240 toward desired location/destination 295. When conventional techniques (e.g., by solving differential equations by a processor) a drilling operation may be controlled in a substandard or poor manner. For example, a drilling operation may proceed too close to Earth formation 230 that makes it difficult or impossible to avoid a drill from entering or impacting Earth formation 230. This may result in apparatus 250 drilling into Earth formation 230 (potentially wearing or damaging the drill or a drill bit) or may cause drilling operations to be delayed until apparatus 250 can be backed up and steered in an appropriate direction.

Systems and techniques of the present disclosure by performing evaluations faster than possible using conventional techniques could allow drilling apparatus 250 to be steered around both Earth formation 220 and Earth formation 230 and toward destination 295 without apparatus 250 moving within a threshold distance from Earth formation 220 or 230. For example, apparatus 250 could be steered to the left side of FIG. 2 as it passes by or just after it passed by Earth formation 220 and then could be steered to the right toward destination or desired location 295 such that Earth formation 230 is avoided. This is one example how, making evaluations more quickly can improve a wellbore operation.

Structures in the Earth, such as Earth formations 220 and 230 may be avoided based on a rule for various reasons. One of these reasons is that it may be advantageous to drill through softer rock to reach a destination as this may result in a faster drilling operation. Another reason this may be advantageous is that hard rock substances may be avoided that could slow a drilling operation or that would be more likely to damage or wear drilling equipment. Rules that may be used to steer a drilling operation may include avoiding areas saturated with water or areas with permeability that is above a threshold level or below a threshold level. Such rules may also identify structures that should be included in a portion of a wellbore. For example, structures suitable for hydraulic fracturing or carbon dioxide ($CO_2$) sequestration may be identified. Such rule may also change by well depth or characteristics of the Earth that change at locations within the Earth. This may allow wellbores to be drilled through Earth formations in a manner that mitigates risks of substances within the Earth (e.g., hydrocarbons) or injected substances (e.g., hydraulic fracturing fluids or $CO_2$) from seeping into the water table of an area.

Figure 3:
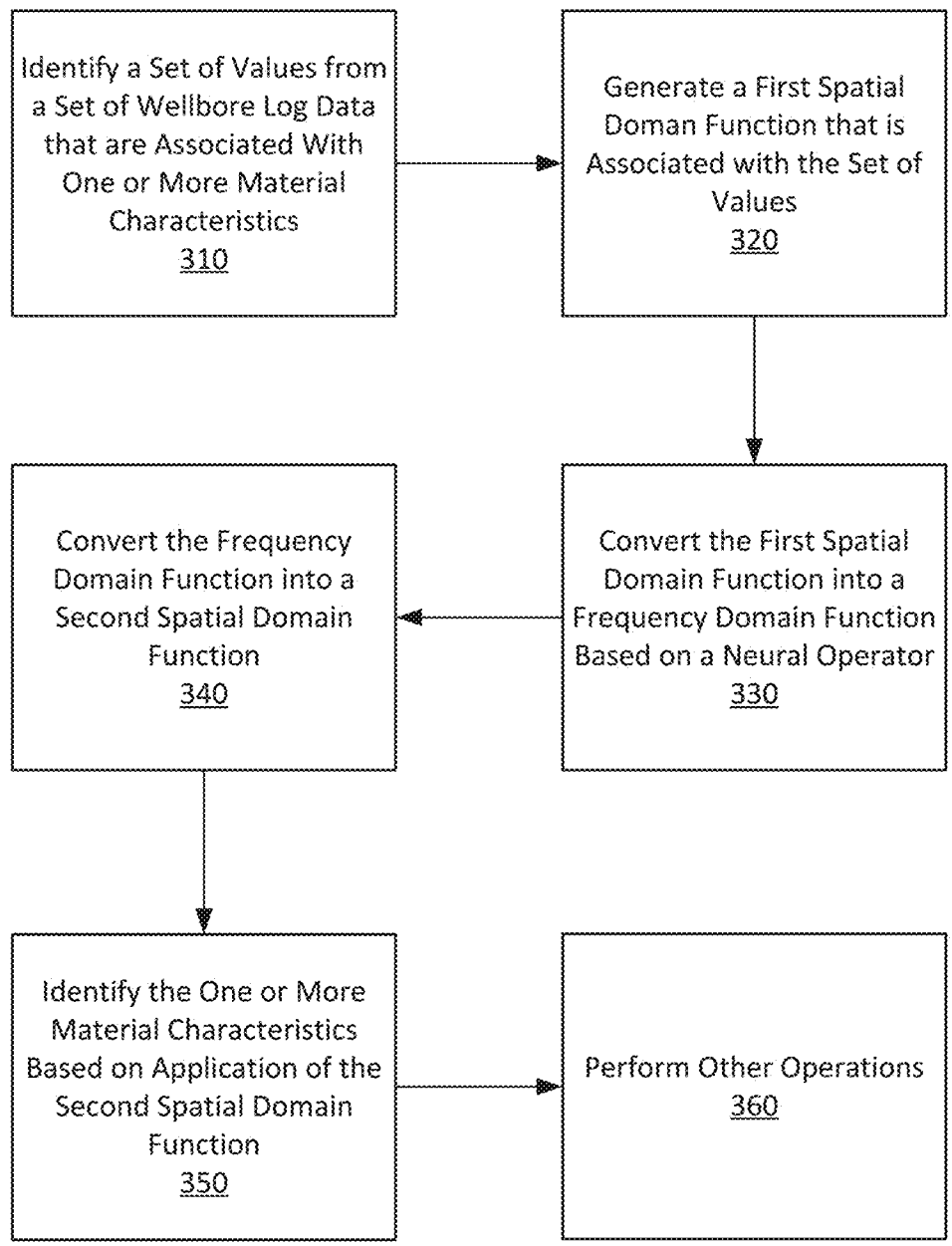
FIG. 3 illustrates an example process for evaluating conditions of an Earth formation, according to some examples of the present disclosure.

FIG. 3 illustrates an example process for evaluating conditions of an Earth formation, according to some examples of the present disclosure. At block 310, the process can include identifying a set of values from a set of wellbore log data. These values from the wellbore log data may be associated with or may correspond to values of data sensed by a sensor located within a wellbore. These values may include values of resistance or resistivity of different areas around a wellbore. Alternatively, or additionally these values may include values of temperature or pressure that may be used to evaluate wellbore conditions. The set of values may be evaluated in order to improve any type of wellbore operation that may include a wellbore drilling operation, a wellbore cementing operation, a hydraulic fracturing operation, or a $CO_2$ injection process.

At block 320 a first spatial domain function may be generated, and this first spatial domain function may evaluate parameters such as distance. This first spatial domain function may be used to identify data associated with material characteristics of the wellbore. For example, the function may describe distances to specific types of materials from a wellbore. For example, the wellbore may be drilled in sandstone when the wellbore is close to a granite rock formation. The function may be associated with estimated parameters and execution of the function by a processor may result in an estimate of the distance between the wellbore and the granite formation. In certain instances, the result may be associated with an error that is above a threshold level. At block 330, the first spatial function may be converted to a first frequency domain function based on the use of a neural operator. Execution of this neural operator may be the equivalent of performing a Fourier transform that transforms functions from the time/space domain into the frequency domain. By implementing such a transform using a neural operator, the solving of a complex differential equation is eliminated, and wellbore operations may continue according to a plan in a manner that limits risks of encountering a negative outcome (e.g., a slowing of operations, equipment wear or damage, or violating a wellbore operational rule).

At block 340, the frequency domain function may be converted into a second spatial domain function. This second spatial domain function may include updated coefficients or updated wellbore log values as compared to the first spatial domain function. These updates may be made based on evaluations performed in the frequency domain. These updates may be referred to as adjustments that update a spatial domain function. At block 350 one or more material characteristics may be identified based on applying the second spatial domain function. Here again results associated with applying the second spatial domain function may be associated with an error. At bock 360 of FIG. 3 other operations may be performed, including yet not limited to operations discussed in respect to FIGS. 4-5 of this disclosure.

Figure 4:
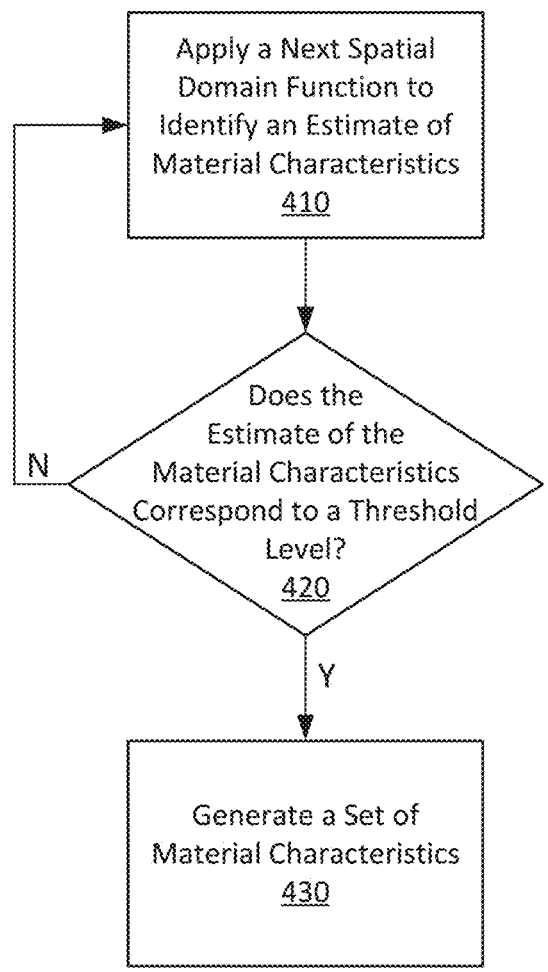
FIG. 4 illustrates an example process for applying updated sets of spatial domain functions when estimates of material characteristics are identified and evaluated, in accordance with various aspects of the subject technology.

FIG. 4 illustrates an example process for applying updated sets of spatial domain functions when estimates of material characteristics are identified and evaluated. At block 410 a next spatial domain function may be applied to identify estimates of material characteristics of a wellbore. For example, the next spatial domain function applied may be the first spatial domain function discussed in respect to FIG. 3. Determination block 420 may identify whether the estimate of the material characteristic meets, corresponds to, or is within a threshold level of accuracy or error. When no, block 410 may again apply a next spatial domain function to estimate the material characteristic. This may include applying the second spatial domain function of FIG. 3. As such, each next spatial domain function applied may be applied after converting a spatial domain function to a frequency domain function, updating coefficients or wellbore log values, and generating another spatial domain function based on the updated coefficients or wellbore log values. Where determination block 420 identifies that the estimate of material characteristics corresponds to the threshold level, a set of material characteristics may be generated at block 430. Alternatively, or additionally, multiple different neural operators may be used to make determinations in parallel and a neural operator that is associated with a minimal error may be used to identify the material characteristics at block 430.

Figure 5:
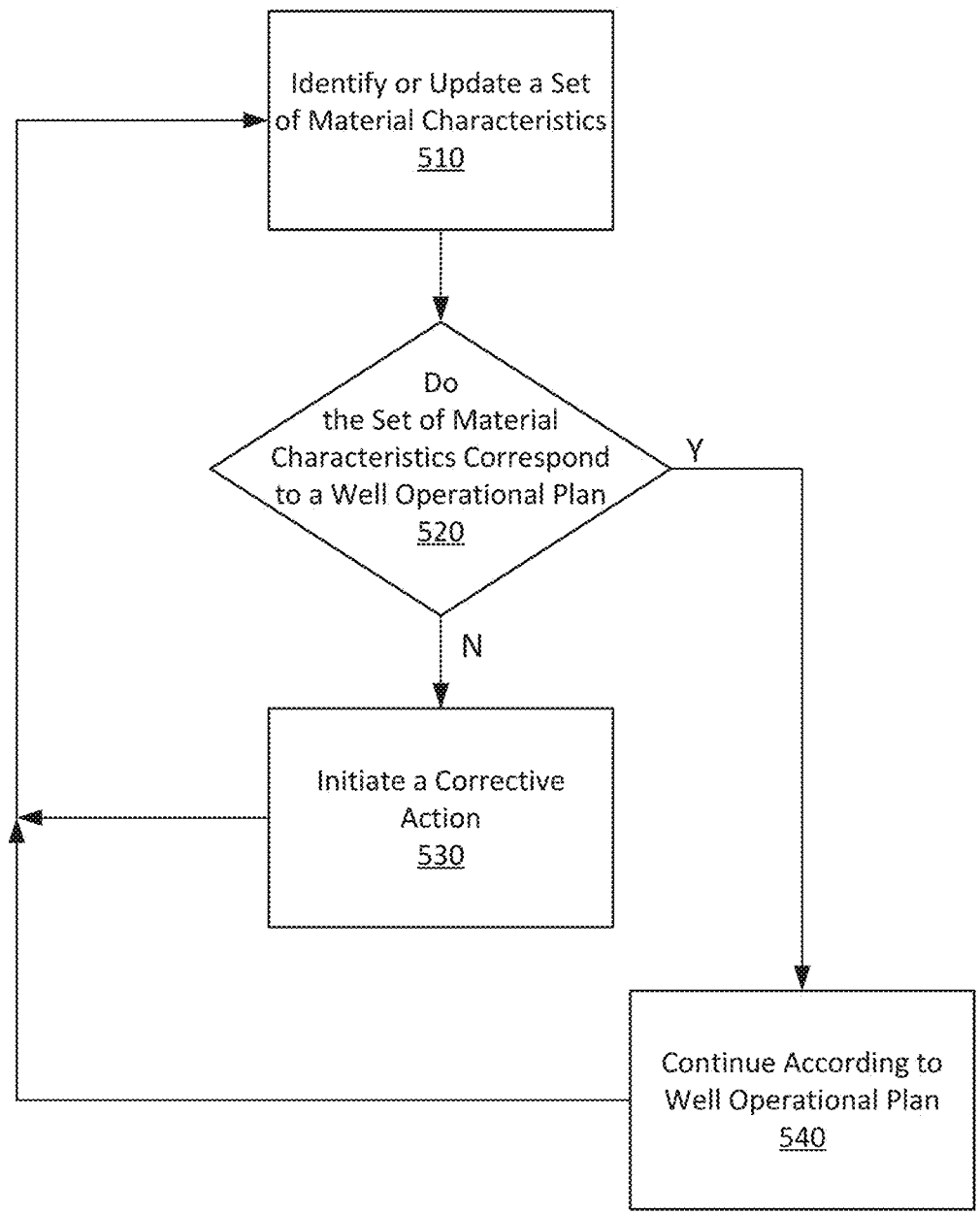
FIG. 5 illustrates an example process for monitoring conditions of an Earth formation, according to some examples of the present disclosure, in accordance with various aspects of the subject technology.

FIG. 5 illustrates an example process for monitoring conditions of an Earth formation, according to some examples of the present disclosure. At block 510, the process can include identifying or updating a set of material characteristics of the wellbore. These material characteristics may identify types of materials, may identify whether materials near the wellbore are cracked, may identify permeability metrics, and/or may identify distances between the wellbore and particular types of materials.

Determination block 520 may identify whether the set of material characteristics correspond to a well operational plan. This may include identifying types of materials in the Earth that should or that should not be drilled through, may include identifying locations in the Earth where hydraulic fracturing or CO2 materials can be injected, or may include other constraints associated with a set of wellbore drilling rules. When the material characteristics do not correspond to the well operational plan, program flow may move to block 530 where a corrective action may be performed. Examples of corrective actions include, steering a drill to avoid or drill into/through certain materials, control a wellbore cementing operation, or change flow rates of materials injected into the Earth. When the set of material characteristics correspond to the well operational plan, wellbore operations may be continued as is according to the wellbore plan. In certain instances, program flow may move from block 540 back to block 510 to once again identify or update material characteristics of the wellbore. As such operations performed in FIG. 5 may be performed when rules associated with a particular type of wellbore operations are performed overtime.

Figure 6:
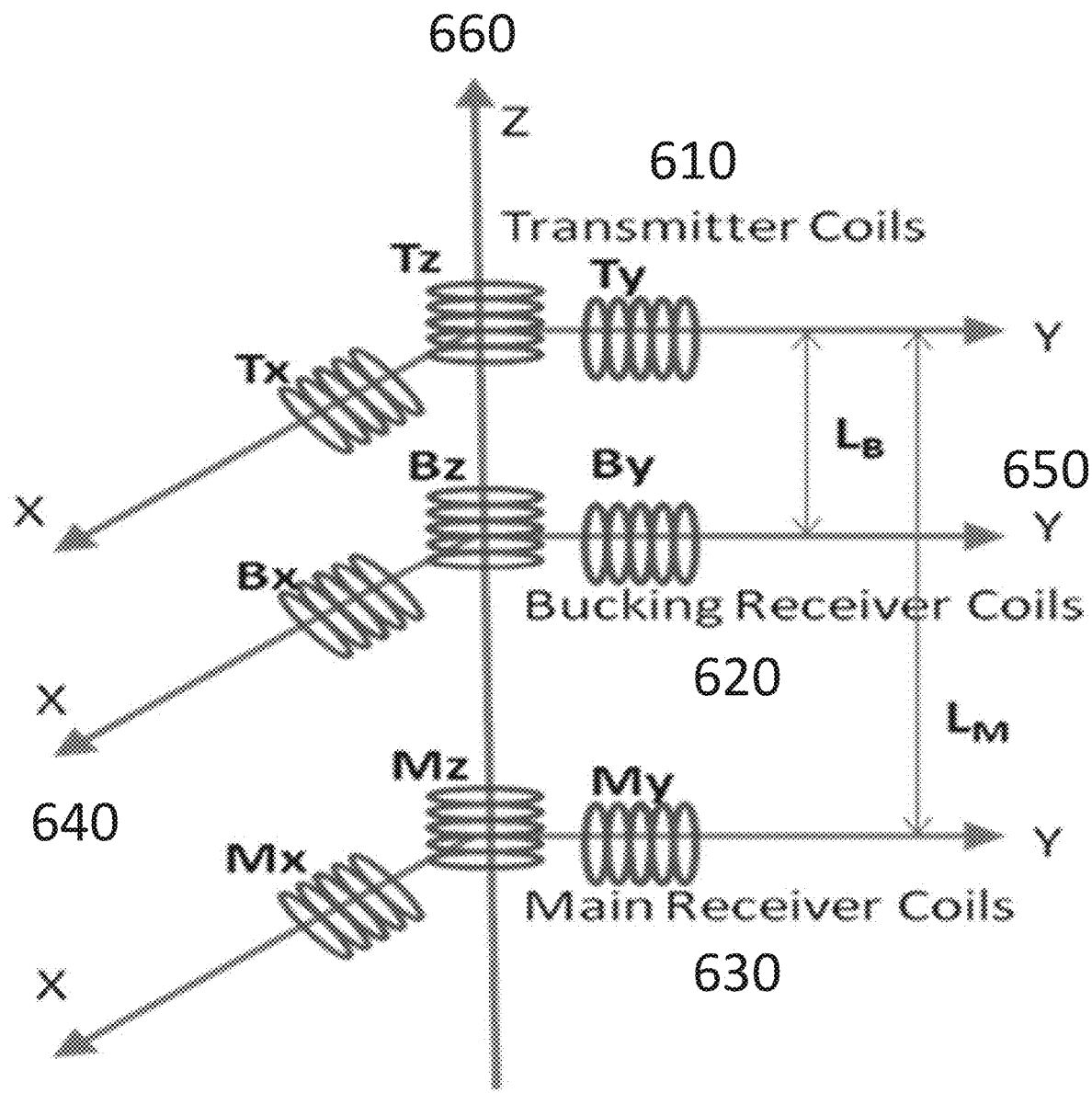
FIG. 6 illustrates sets of transmitting elements and receiving elements that may be used to transmit electromagnetic signals through the Earth and to collect energy from those transmitted electromagnetic signals when evaluations associated with a wellbore are performed in real-time or near-real-time, in accordance with various aspects of the subject technology.

FIG. 6 illustrates sets of transmitting elements and receiving elements that may be used to transmit electromagnetic signals through the Earth and to collect energy from those transmitted electromagnetic signals when evaluations associated with a wellbore are performed in real-time or near-real-time. FIG. 6 includes a set of three transmitter coils 610 (a triad of transmitter coils 610), a set of three bucking receiver coils 620 (a triad of bucking receiver coils 620), and a set of three main receiver coils 630 (a triad of main receiver coils 630). Each of these sets of triad coils 610, 620, and 630 may include one coil oriented along an X axis 640, a second coil oriented along a Y axis 650, and a third coil oriented along a Z axis 660. Each of these axes (X, Y, and Z) may be perpendicular to each other.

In certain instances, in order to remove the signal that goes directly from the transmitter to the receiver and obtain better measurement data regarding a ground/Earth formation, systems of the present disclosure may include two different sets of receiver coils a bucking receiver coil set 620 and a main receiver coil 630. Bucking receiver coils 620 may block or prevent EM fields transmitted from the transmitter coils 610 from being directly received by the main receiver coils 630 when each of these sets of triad coils 610, 620, and 630 are included in a same data collection tool. The bucking receiver coils 620 may shield the main receiver coils from receiving directly induced EM fields (from the transmitter coils) because the bucking receiver coils 620 will absorb those EM fields while providing a back voltage (electromagnetic force—EMF) that interferes the EM fields from moving from the transmitter coils 610 through bucking receiver coils 620 to main receiver coils 630. When transmitting coil transmits EM signals, portions of those EM signals may be reflected off of formations within the ground/Earth and then those reflected signals may be received by the main receiving coils 630 as sensed signals that are converted into EM measurement data by an analog to digital converter. As or shortly after these EM signals are received, the associated EM measurement data may be evaluated using systems and techniques of the present disclosure.

Figure 7:
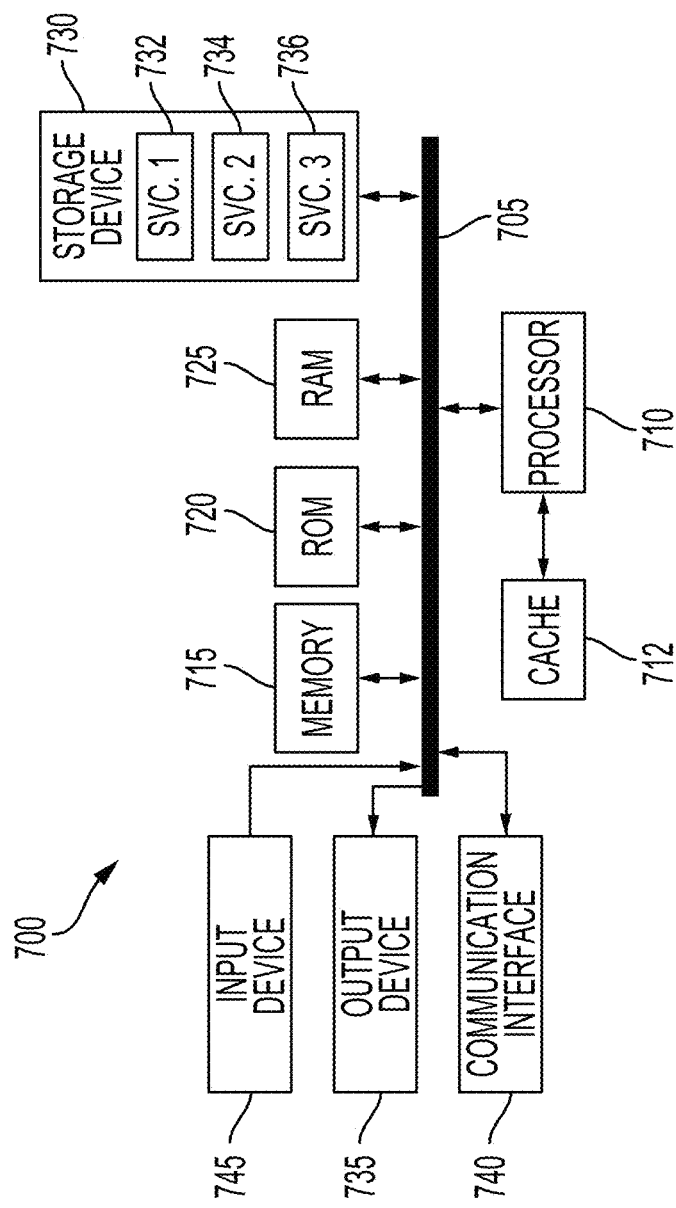
FIG. 7 illustrates an example computing device architecture which can be employed to perform various steps, methods, and techniques disclosed herein.

FIG. 7 illustrates an example computing device architecture 700 which can be employed to perform any of the systems and techniques described herein. In some examples, the computing device architecture can be integrated with the electromagnetic imager tools described herein. Further, the computing device can be configured to implement the techniques of controlling borehole image blending through machine learning described herein.

The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random-access memory (RAM) 725, to the processor 710.

The computing device architecture 700 can include a cache of high-speed memory connected directly with, in close proximity to, or integrated as part of the processor 710.

The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general-purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method implemented in software, or combinations of hardware and software.

In some instances, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples and aspects thereof, but those skilled in the art will recognize that the application is not limited thereto. Thus, while illustrative examples and aspects of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, examples and aspects of the systems and techniques described herein can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Methods and apparatus of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Such methods may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1. A method comprising identifying a set of values included in a set of wellbore log data, the set of values associated with material characteristics of a wellbore; generating a first spatial domain function associated with the set of values when preparing to convert the first spatial domain function into a frequency domain function based on a neural operator; converting the first spatial domain function into the frequency domain function based on the neural operator; converting the frequency domain function into a second spatial domain function; and identifying the material characteristics of the wellbore based on application of the second spatial domain function.

Aspect 2: The method of Aspect 1, further comprising applying the first spatial domain function to identify an estimate of the material characteristics of the wellbore; and identifying that the estimate of the material characteristics does not correspond to a physical response associated with the set of values within a threshold level.

Aspect 3: The method of any of Aspects 1 to 2, further comprising identifying a direction to steer a drill that is drilling the wellbore based on a determination associated with the identified material characteristics.

Aspect 4: The method of any of Aspects 1 to 3, further comprising identifying a corrective action that should be performed to a wellbore operation based on the identified material characteristics of the wellbore; and initiating execution of the corrective action based on near-real time assessments made by application of the neural operator.

Aspect 5: The method of any of Aspects 1 to 4, further comprising identifying adjustments to make to one or more values of the first spatial domain function thereby generating a plurality of variations of the first spatial domain function, wherein one of the variations of the spatial domain function is converted into the frequency domain function and another variation of the spatial domain function is converted into a second frequency domain function based on application of the neural operator or a second neural operator.

Aspect 6: The method of any of Aspects 1 to 5, wherein at least one value of the adjustments made to the one or more values of the first spatial domain function is a coefficient.

Aspect 7: The method of any of Aspects 1 to 6, wherein at least one value of the adjustments made to the one or more values of the first spatial domain function is a wellbore log value.

Aspect 8: A non-transitory computer-readable storage medium having embodied thereon instructions executable by one or more processors for performing a method comprising identifying a set of values included in a set of wellbore log data, the set of values associated with material characteristics of a wellbore; generating a first spatial domain function associated with the set of values when preparing to convert the first spatial domain function into a frequency domain function based on a neural operator; converting the first spatial domain function into the frequency domain function based on the neural operator; converting the frequency domain function into a second spatial domain function; and identifying the material characteristics of the wellbore based on application of the second spatial domain function.

Aspect 9: The non-transitory computer-readable storage medium of Aspect 8, the instructions further executable by the one or more processors to apply the first spatial domain function to identify an estimate of the material characteristics of the wellbore; and identify that the estimate of the material characteristics does not correspond to a physical response associated with the set of values within a threshold level.

Aspect 10: The non-transitory computer-readable storage medium of any of Aspects 8 to 9, the instructions further executable by the one or more processors to identify a direction to steer a drill that is drilling the wellbore based on a determination associated with the identified material characteristics.

Aspect 11: The non-transitory computer-readable storage medium of any of Aspects 8 to 10, the instructions further executable by the one or more processors to identify a corrective action that should be performed to a wellbore operation based on the identified material characteristics of the wellbore; and initiate execution of the corrective action based on near-real time assessments made by application of the neural operator.

Aspect 12: The non-transitory computer-readable storage medium of any of Aspects 8 to 11, the instructions further executable by the one or more processors to identify adjustments to make to one or more values of the first spatial domain function thereby generating a plurality of variations of the first spatial domain function, wherein one of the variations of the spatial domain function is converted into the frequency domain function and another variation of the spatial domain function is converted into a second frequency domain function based on application of the neural operator or a second neural operator.

Aspect 13: The non-transitory computer-readable storage medium of any of Aspects 8 to 12, wherein at least one value of the adjustments made to the one or more values of the first spatial domain function is a coefficient.

Aspect 14: The non-transitory computer-readable storage medium of any of Aspects 8 to 13, wherein at least one value of the adjustments made to the one or more values of the first spatial domain function is a wellbore log value.

Aspect 15. An apparatus comprising a memory; and one or more processors that execute instructions out of the memory to: identify a set of values included in a set of wellbore log data, the set of values associated with material characteristics of a wellbore, generate a first spatial domain function associated with the set of values when preparing to convert the first spatial domain function into a frequency domain function based on a neural operator, convert the first spatial domain function into the frequency domain function based on the neural operator, convert the frequency domain function into a second spatial domain function, and identify the material characteristics of the wellbore based on application of the second spatial domain function.

Aspect 16: The apparatus of Aspect 15, wherein the one or more processors execute the instructions out of the memory to apply the first spatial domain function to identify an estimate of the material characteristics of the wellbore; and identify that the estimate of the material characteristics does not correspond to a physical response associated with the set of values within a threshold level.

Aspect 17. The apparatus of any of aspects 15 to 16, wherein the one or more processors execute the instructions out of the memory to identify a direction to steer a drill that is drilling the wellbore based on a determination associated with the identified material characteristics.

Aspect 18: The apparatus of any of aspects 15 to 17, wherein the one or more processors execute the instructions out of the memory to identify a corrective action that should be performed to a wellbore operation based on the identified material characteristics of the wellbore; and initiate execution of the corrective action based on near-real time assessments made by application of the neural operator.

Aspect 19. The apparatus of any of aspects 15 to 18, wherein the one or more processors execute the instructions out of the memory to identify adjustments to make to one or more values of the first spatial domain function thereby generating a plurality of variations of the first spatial domain function, wherein one of the variations of the spatial domain function is converted into the frequency domain function and another variation of the spatial domain function is converted into a second frequency domain function based on application of the neural operator or a second neural operator.

Aspect 20: The apparatus of any of aspects 15 to 19, wherein at least one value of the adjustments made to the one or more values of the first spatial domain function is a coefficient.

What is claimed is:

1. A method comprising:
   identifying a set of values included in a set of wellbore log data, the set of values associated with material characteristics of a wellbore;
   generating a first spatial domain function associated with the set of values when preparing to convert the first spatial domain function into a frequency domain function based on a neural operator;
   converting the first spatial domain function into the frequency domain function based on the neural operator;
   converting the frequency domain function into a second spatial domain function; and
   identifying the material characteristics of the wellbore based on application of the second spatial domain function.

2. The method of claim 1, further comprising:
   applying the first spatial domain function to identify an estimate of the material characteristics of the wellbore; and
   identifying that the estimate of the material characteristics does not correspond to a physical response associated with the set of values within a threshold level.

3. The method of claim 1, further comprising:
   identifying a direction to steer a drill that is drilling the wellbore based on a determination associated with the identified material characteristics.

4. The method of claim 1, further comprising:
   identifying a corrective action that should be performed to a wellbore operation based on the identified material characteristics of the wellbore; and
   initiating execution of the corrective action based on near-real time assessments made by application of the neural operator.

5. The method of claim 1, further comprising:
   identifying adjustments to make to one or more values of the first spatial domain function thereby generating a plurality of variations of the first spatial domain function, wherein one of the variations of the spatial domain function is converted into the frequency domain function and another variation of the spatial domain function is converted into a second frequency domain function based on application of the neural operator or a second neural operator.

6. The method of claim 5, wherein at least one value of the adjustments made to the one or more values of the first spatial domain function is a coefficient.

7. The method of claim 5, wherein at least one value of the adjustments made to the one or more values of the first spatial domain function is a wellbore log value.

8. A non-transitory computer-readable storage medium having embodied thereon instructions executable by one or more processors for performing a method comprising:
   identifying a set of values included in a set of wellbore log data, the set of values associated with material characteristics of a wellbore;
   generating a first spatial domain function associated with the set of values when preparing to convert the first spatial domain function into a frequency domain function based on a neural operator;
   converting the first spatial domain function into the frequency domain function based on the neural operator;
   converting the frequency domain function into a second spatial domain function; and
   identifying the material characteristics of the wellbore based on application of the second spatial domain function.

9. The non-transitory computer-readable storage medium of claim 8, the instructions further executable by the one or more processors to:
   apply the first spatial domain function to identify an estimate of the material characteristics of the wellbore; and
   identify that the estimate of the material characteristics does not correspond to a physical response associated with the set of values within a threshold level.

10. The non-transitory computer-readable storage medium of claim 8, the instructions further executable by the one or more processors to:
    Identify a direction to steer a drill that is drilling the wellbore based on a determination associated with the identified material characteristics.

11. The non-transitory computer-readable storage medium of claim 8, the instructions further executable by the one or more processors to:
    identify a corrective action that should be performed to a wellbore operation based on the identified material characteristics of the wellbore; and
    initiate execution of the corrective action based on near-real time assessments made by application of the neural operator.

12. The non-transitory computer-readable storage medium of claim 8, the instructions further executable by the one or more processors to:
    identify adjustments to make to one or more values of the first spatial domain function thereby generating a plurality of variations of the first spatial domain function, wherein one of the variations of the spatial domain function is converted into the frequency domain function and another variation of the spatial domain function is converted into a second frequency domain function based on application of the neural operator or a second neural operator.

13. The non-transitory computer-readable storage medium of claim 12, wherein at least one value of the adjustments made to the one or more values of the first spatial domain function is a coefficient.

14. The non-transitory computer-readable storage medium of claim 12, wherein at least one value of the adjustments made to the one or more values of the first spatial domain function is a wellbore log value.

15. An apparatus comprising:
    a memory; and
    one or more processors that execute instructions out of the memory to:
        identify a set of values included in a set of wellbore log data, the set of values associated with material characteristics of a wellbore,
        generate a first spatial domain function associated with the set of values when preparing to convert the first spatial domain function into a frequency domain function based on a neural operator,
        convert the first spatial domain function into the frequency domain function based on the neural operator,
        convert the frequency domain function into a second spatial domain function, and identify the material characteristics of the wellbore based on application of the second spatial domain function.

16. The apparatus of claim 15, wherein the one or more processors execute the instructions out of the memory to:
apply the first spatial domain function to identify an estimate of the material characteristics of the wellbore; and
identify that the estimate of the material characteristics does not correspond to a physical response associated with the set of values within a threshold level.

17. The apparatus of claim 15, the one or more processors execute the instructions out of the memory to:
identify a direction to steer a drill that is drilling the wellbore based on a determination associated with the identified material characteristics.

18. The apparatus of claim 15, the one or more processors execute the instructions out of the memory to:
identify a corrective action that should be performed to a wellbore operation based on the identified material characteristics of the wellbore; and
initiate execution of the corrective action based on near-real time assessments made by application of the neural operator.

19. The apparatus of claim 15, the one or more processors execute the instructions out of the memory to:
identify adjustments to make to one or more values of the first spatial domain function thereby generating a plurality of variations of the first spatial domain function, wherein one of the variations of the spatial domain function is converted into the frequency domain function and another variation of the spatial domain function is converted into a second frequency domain function based on application of the neural operator or a second neural operator.

20. The apparatus of claim 19, wherein at least one value of the adjustments made to the one or more values of the first spatial domain function is a coefficient.

\* \* \* \* \*